Aug. 28, 1951  P. KETELSEN  2,565,691
METHOD AND APPARATUS FOR SUPPLYING A LIQUID
TO A FLUID PRESSURE MEDIUM UNDERFLOW
Filed Nov. 29, 1948  3 Sheets-Sheet 1
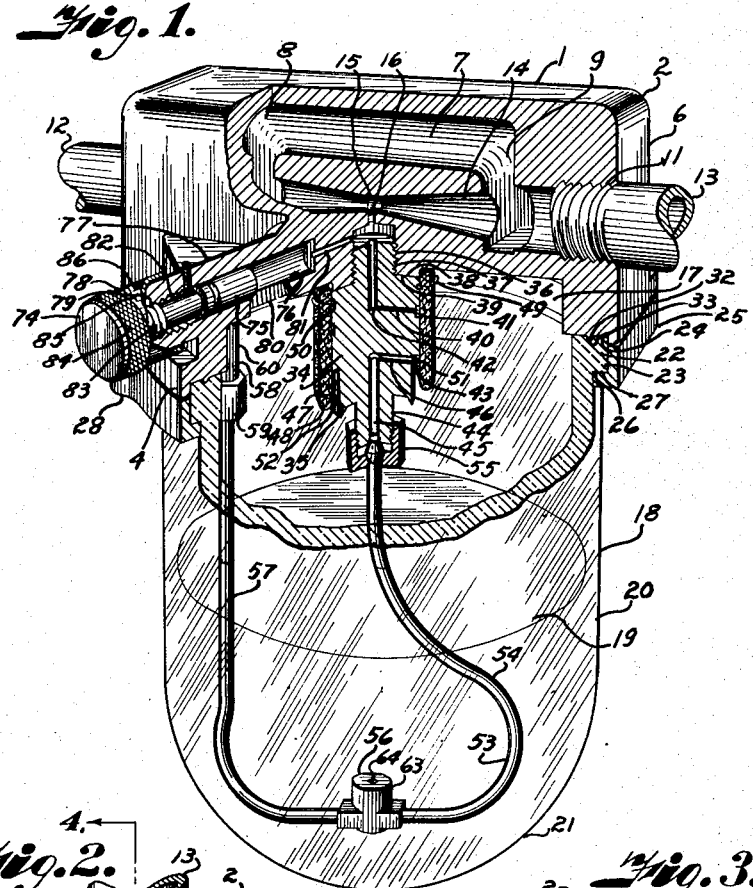
Inventor
Peter Ketelsen
By Fishburn & Mullendore
Attorneys

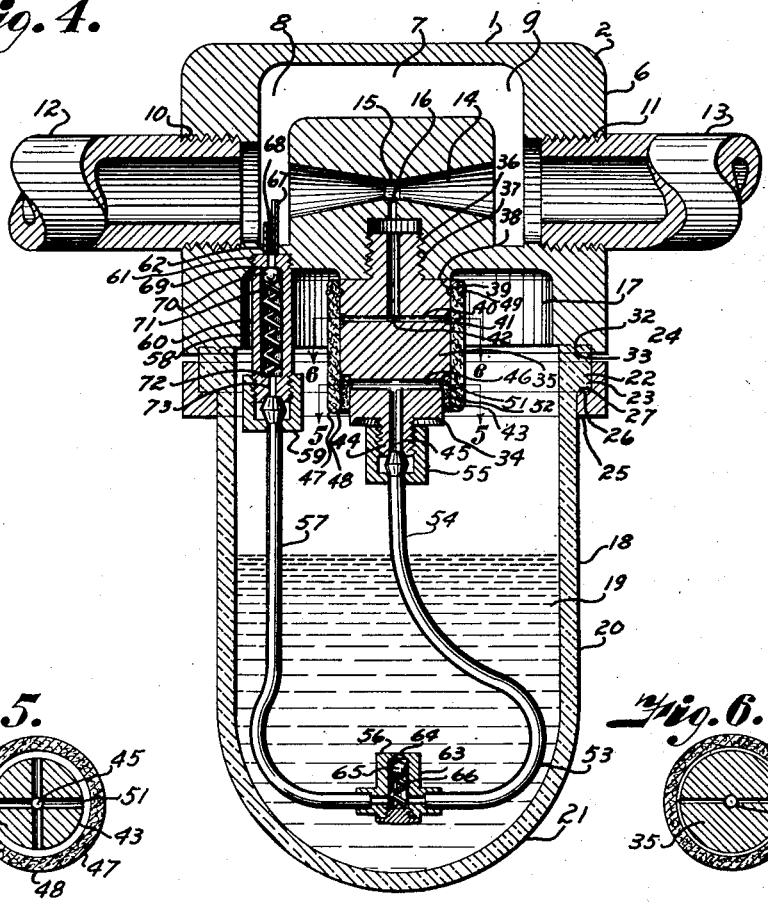

Aug. 28, 1951 P. KETELSEN 2,565,691
METHOD AND APPARATUS FOR SUPPLYING A LIQUID
TO A FLUID PRESSURE MEDIUM UNDERFLOW
Filed Nov. 29, 1948 3 Sheets-Sheet 3
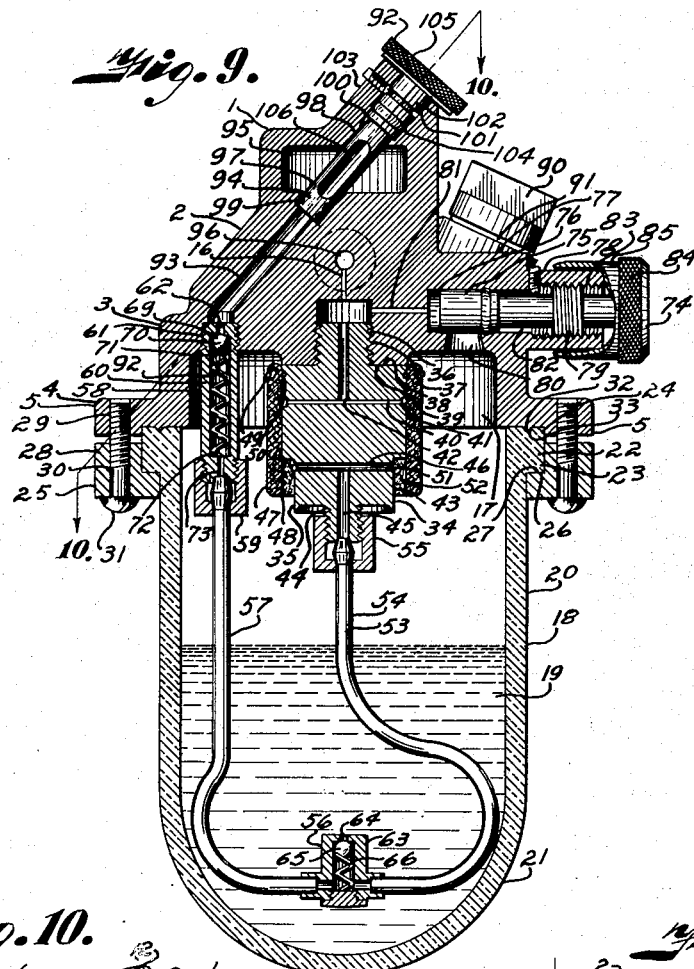
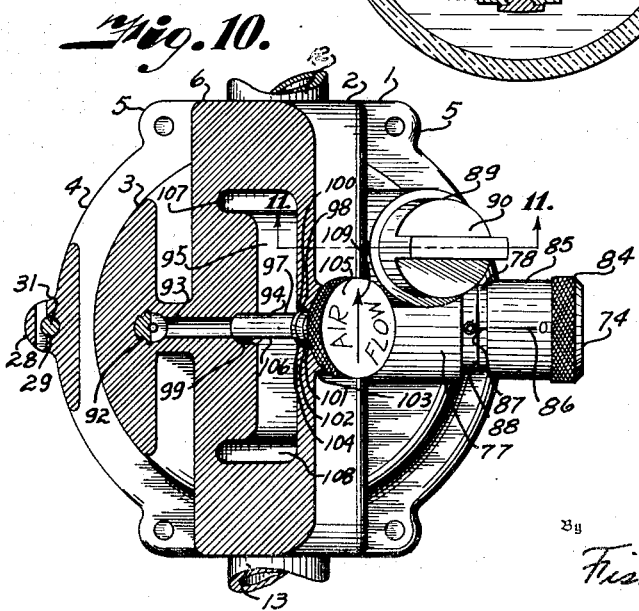
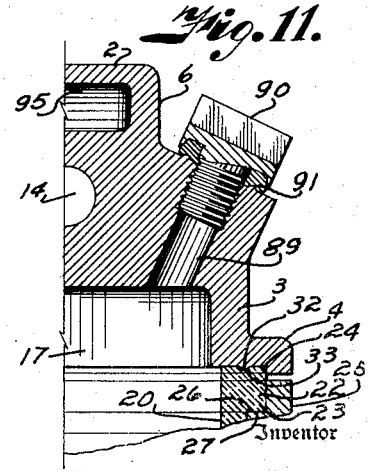
Inventor
Peter Ketelsen
By Fishburn & Mullendore
Attorneys Patented Aug. 28, 1951

2,565,691

UNITED STATES PATENT OFFICE 2,565,691

METHOD AND APPARATUS FOR SUPPLYING A LIQUID TO A FLUID PRESSURE MEDIUM UNDER FLOW

Peter Ketelsen, Wichita, Kans., assignor to Air Appliances, Inc., Wichita, Kans., a corporation of Kansas Application November 29, 1948, Serial No. 62,548

14 Claims. (Cl. 184—55)

This invention relates to a method and apparatus for supplying a liquid to a fluid pressure medium under flow, for example, a lubricant into a stream of compressed air being delivered to a pneumatically operated mechanism which requires lubrication of the working parts that are contacted by the compressed air.

The principal object of the invention is to provide for injection and control of the lubricant in a manner to supply the exact amount required, thereby avoiding waste and assuring optimum efficiency of the machine being operated.

Another object of the invention is to supply the lubricant in a finely atomized or substantially vaporous form, thereby assuring uniform entrainment of the lubricant particles in a flowing stream of the pressure medium.

Other objects of the invention are to provide a simple and inexpensively constructed device that is positive in operation which functions responsive to the aspirating effect of the air or fluid pressure medium; and to provide for control of the aspirating effect to regulate finely the quantity of lubricant introduced into the fluid pressure medium.

Further objects of the invention are to provide a device whereby an ample volume or over supply of lubricant is delivered to a capillary feeder from which the desired amount of lubricant is aspirated into a flow of pressure medium; to provide a device that is connected into the pressure supply line at any desired point, with the controls and filler plug all positioned for ready access thereto; to provide a non-clogging lubricator; to provide a device with working parts that are readily accessible for inspection and replacement; and to provide a device which permits use of a transparent lubricant container.

In accomplishing these and other objects of the invention, I have provided improved structure, the preferred forms of which are illustrated in the accompanying drawings wherein:

Fig. 1 is a perspective view of a device constructed in accordance with the present invention, parts being broken away and shown in section to better illustrate the construction and arrangement of flow passageways.

Fig. 2 is a plan view of the device.

Fig. 3 is an elevation of the head portion of the device, the inlet pipe being shown in cross section.

Fig. 4 is a vertical section through the device on the line 4—4 of Fig. 2.

Fig. 5 is a detail cross section on the line 5—5 of Fig. 4, particularly illustrating the parts for supplying lubricant to the wick feeder.

Fig. 6 is a similar section on the line 6—6 of Fig. 4 illustrating the ports through which lubricant is aspirated from the wick feeder.

Fig. 7 is a vertical section through the upper portion of the device taken on the line 7—7 of Fig. 2.

Fig. 8 is a fragmentary section on the line 8—8 of Fig. 2, particularly illustrating the filler opening through which lubricant is supplied to the lubricant receptacle.

Fig. 9 is a vertical section through a modified form of device.

Fig. 10 is a section on the line 10—10 of Fig. 9.

Fig. 11 is a fragmentary section on the line 11—11 of Fig. 10.

Referring more in detail to the drawings:

1 designates a device constructed in accordance with the present invention for feeding a liquid to a fluid pressure medium under flow, for example, a lubricant into a flow of compressed air being delivered to a pneumatically operated machine or the like.

The device comprises a head member 2 having a substantially circular base portion 3 encircled by a flange 4 provided with circumferentially spaced ears 5. Projecting upwardly from the portion 3 is a transverse extension or rib 6 in which is provided a main fluid pressure passageway 7 having depending leg portions 8 and 9 in connection with lateral ports 10 and 11. The ports 10 and 11 are internally threaded to connect aligning pipe sections 12 and 13 of a fluid pressure medium supply duct which conducts the pressure medium from a source of supply to an operating device. The extension 6 also has a secondary passageway 14 interconnecting the legs 8 and 9 preferably in axial registry with the ports 10 and 11. The passage 14 is of Venturi shape in that it has a constriction 15 for increasing velocity of flow across a lateral port or passage 16 later described.

Formed in the base portion 3 is a recess 17. Cooperating with the head member and depending below the recess is a cup-shaped receptacle 18 for containing a body of liquid 19, for example, a lubricant to be supplied to the pressure medium flowing through the Venturi passageway 14. The receptacle 18 is preferably formed of transparent material and has an annular wall 20 rounding into a rounding bottom 21. The rim 22 of the wall 20 has an annular outwardly projecting flange 23 that seats within a recess 24 encircling the recess 17. The flange is retained in seated position by a clamping ring 25 encircling the flange 23 and having an inwardly extending annular ledge 26 engaging under the shoulder 27 provided by the flange 23. The clamping ring has outwardly projecting ears 28 corresponding with the ears 5 of the head member and which are provided with threaded openings 29 registering with corresponding openings 30 in the ears 5 to pass fastening devices such as screws 31. To assure a leak-tight joint between the rim 22 of the receptacle and the recess 24, the head member is preferably provided with a rib 32 that engages in a groove 33 in the upper face of the rim.

In accordance with the present invention, the lubricant in the receptacle is supplied to the flow of pressure medium in a finely atomized or vaporized form so that it is uniformly entrained by the pressure medium. In accomplishing this result the lubricator is constructed to produce an aspirating effect upon a capillary feed of the lubricant and to supply the lubricant to the capillary feeding means in ample quantity without possibility of drawing slugs of lubricant into the Venturi-shaped passageway.

The aspirating means in addition to the Venturi-shaped passageway 14 includes a fitting 34 having a cylindrical body 35 that is suspended within the space above the lubricant by a reduced threaded neck 36 which is threaded into an internally threaded socket 37 of the cap member, the socket 37 being in axial alignment with the port 16. The neck 36 of the fitting forms an annular shoulder 38 with the body 35 thereof to seat against a face of the boss 39 to cooperate with the threaded connection in forming a leak-tight joint between the receptacle and the port 16. The fitting has a transverse canal 40 connecting the circumferential groove or channel 41 on the body 35 with an axial bore 42 registering with the port 16 and through which lubricant is aspirated from the capillary feeding means as later described.

The lower end of the body is of reduced diameter and has a circumferential depending lip 43 from which excess lubricant drains back into the receptacle as later described. Formed axially of the reduced lower end of the body 35 is a threaded neck 44 having a bore 45 that continues into the reduced portion of the body and connects with crossed diametrical channels 46 which open through the circumferential face thereof for discharging lubricant onto a capillary feeder 47. The capillary feeder comprises a tubular wick 48 which is sleeved over the body portion of the fitting in covering relation with the circumferential groove 41 and which is attached to the fitting above the groove by a circumferential tie 49 which presses the material of the wick into a circumferential groove 50 in the fitting. The wick is of sufficient length to depend below the outlets 51 of the channels 46 and cooperates with the reduced portion of the cylindrical body to provide an annular passageway 52 therebetween through which lubricant discharged from the outlets is sprayed onto the skirt portion of the tubular wick and from which excess lubricant drains downwardly into the receptacle. The lubricant absorbed by the wick material is fed upwardly therein by capillary action and wets the surface exposed in the annular groove 41.

To assure an ample supply of lubricant to the capillary feeder, a pumping mechanism is provided including a somewhat U-shaped duct 53 depending into the lubricant in the receptacle. One leg of the duct comprises a tube 54 that is connected with the bore 45 through a union nut 55 threaded onto the neck 44. The tube 54 curves outwardly toward the wall of the receptacle and terminates in a reverse curve connected with a lubricant inlet fitting 56. The other leg of the duct comprises a tube 57 having its upper end connected with a check valve 58 by a union nut 59 that is threaded on the tube-like body 60 of the check valve. The upper end of the tube-like body 60 is threaded into an internally threaded recess 61 connecting with a bore 62 opening from the leg 8 of the main passageway 7. The lower end of the tube 57 curves outwardly and inwardly to connect with the inlet fitting 56 to complete the U-shaped duct. The inlet fitting 56 has a valve chamber 63 forming a flow connection between the tubes 53 and 57 and with the body of lubricant through an inlet port 64. A ball valve 65 is supported in position to close the port 64 by a coil spring 66 that is carried in the valve chamber 63.

The tubular body 60 of the check valve carries an inlet nozzle 67 that extends through the bore 62 and projects into the path of the pressure medium that issues from the pipe section 12 when the pneumatic machine is in operation as later described. The nozzle 67 has a bore 68 that continues into the body of the check valve and terminates in a seat 69 for a ball valve 70 that is normally retained in seated position by a coil spring 71 enclosed in the body of the valve and which has its lower end seated upon a shoulder 72 in encircling relation with a port 73 that connects with the tube 57.

In order to control the volume flow of lubricant into the pressure fluid, means is provided to regulate the aspirating effect on the lubricant as now to be described. The head of the lubricator carries a regulating mechanism 74 including a piston type valve 75 reciprocably mounted in the bore 76 formed in a lateral extension 77 and which terminates in a collar 78 having an internally threaded bore 79 of slightly larger diameter than the bore 76. The bore 76 connects with the recess 17 through a slot-like port 80 that extends longitudinally of the bore 76 and which is adapted to be valved off by the piston 75 so that the effective area of the port is adjusted by the position of the piston-like valve. The bore 76 also connects with the port 16 through a channel 81. The aspirating effect on the capillary feeder is thus controlled by adjusting the piston 75 to allow a portion of the aspirating effect created by the pressure medium flowing through the Venturi-shaped passageway to be expended through the port 80 and thereby lessen the aspirating effect on the lubricant which results in reducing the amount of lubricant drawn into the pressure medium.

In order to adjust the position of the piston the piston is provided with a stem 82 having a threaded collar 83 engaging the threads 79. The stem also carries a knurled knob 84 having a sleeve portion 85 that telescopes over the collar 78 when the knurled knob is rotated to position the piston. With this arrangement the effective area of the slot-like port may be calibrated by providing a certain pitch of threads and by providing the sleeve portion of the adjusting knob with a mark 86 which is adapted to register with a mark 87 on the collar after each complete turn of the knob. The collar 78 may also be graduated transversely as indicated at 88 in correspondence with the pitch of the threads. Therefore a micrometer adjustment is provided so as to accurately position the piston in providing an effective port area to give the desired amount of lubricant fed into the flow of pressure medium. The lubricant may be inserted into the receptacle through a fill opening 89 in the head member 2 and which is normally closed by a threaded plug 90 carrying a gasket 91 which forms a pressure-tight seal about the fill opening 89.

In the form of the invention shown in Figs. 9 to 11 the structure is substantially the same with the exception that the pressure inlet check valve 92 corresponding with the check valve 58 is connected by a port 93 with an inlet nozzle 94 that is positioned transversely of the passageway 95 intermediate the ends of the Venturi-shaped passageway 96. In this form the nozzle 94 includes a tube 97 rotatably mounted in a bore 98 forming a continuation of the port 93 and which provides bearing portions 99 and 100 on the respective sides of the passageway 95. The outer end of the nozzle has a collar portion 101 that is rotatable within a counterbore 102 that is formed in a boss 103 of the cap member. The collar portion 101 carries a packing ring 104 that seals about the collar and prevents the loss of pressure medium. The collar portion 101 carries an adjusting knob 105 by which the nozzle may be rotated to position a slot 106 of the nozzle in facing relation with one or the other of the legs 107 and 108 of the passageway 95 whereby the lubricator is effective in feeding lubricant into the pressure medium regardless of the direction of flow of the pressure medium therethrough. This is an important feature as it permits locating the filler plug and adjusting mechanism in convenient position for operation when the lubricator is located in close proximity to a machine. The direction of flow in which the nozzle is effective is indicated by an arrow 109 carried on the head of the adjusting nut as shown in Fig. 10. The structure of the lubricator is otherwise substantially the same as that illustrated in Figs. 1 to 8 inclusive and the operation and method of introducing lubricant into the pressure medium is the same.

In using a lubricator of the type shown in Figs. 1 to 8, the port 10 on the inlet side having the nozzle 67 is connected to the upstream pipe section 12 and the port 11 is connected to the downstream pipe section 13 which leads to the pneumatically operated machine.

When the control valve of the machine (not shown) is operated to allow flow of pressure medium through the line including the pipes 12 and 13, the major portion of the pressure medium travels through the passageway 7 and the remaining portion through the Venturi-shaped passageway 14 to produce an aspirating effect through the port 16. The pressure impulse caused by opening the control valve of the machine effects unseating of the ball valve 70 so that a portion of the pressure medium is bypassed through the tube 57 and effects discharge of lubricant that has entered through the port 64 through the tube 54 upon closing of the ball valve 65, the lubricant discharging upon the capillary feeder to effect substantial saturation and feed of the lubricant by capillary action to the annular groove 40. The surplus lubricant drips into the receptacle. The increased velocity of the pressure medium upon passing through the restricted portion of the venturi produces a low pressure area over the port 16 to produce an aspirating effect on the lubricant exposed by the groove 41 and the lubricant is drawn through the inlets of the canal 40 and the axial bore 42 to the port 16 where it is discharged into the pressure medium flowing through the venturi. The lubricant thus discharged is in finely divided and substantially vaporous form and when discharged from the Venturi-shaped passageway, the particles uniformly entrain with the pressure medium flowing to the machine being operated.

When the machine operating valve is closed and flow of pressure medium is suspended the ball valve 70 seats and the valve 65 unseats to allow lubricant to flow from the receptacle through the inlet port 64 into the U-shaped duct ready to be discharged onto the capillary feeder when the machine valve is again operated.

In order to assure the proper amount of lubricant being delivered into the pressure medium, the piston-like valve 75 is adjusted so as to vary the effective area in the slot-like port 80 and thereby regulate the aspirating action so that the effectiveness thereof is just sufficient to draw the desired amount of lubricant, the proper position of the valve 75 being readily noted by the calibrations 80.

The form of the invention illustrated in Figs. 9 to 11 inclusive operates in exactly the same manner except that the inlet nozzle 94 is positioned according to the direction of flow of pressure medium through the lubricator. That is, the knob 105 is turned to a position where the arrow 108 is pointing in the direction of the air flow. The slot-like port therein is then in position to intercept and divert a portion of the air flow to operate the pump mechanism.

From the foregoing it is obvious that I have provided a method and apparatus for supplying liquid to a fluid pressure medium under flow in the amount required, thereby avoiding waste and assuring optimum efficiency of the machine operated. It is also obvious that I have provided a lubricator that is of simple and inexpensive construction and which effects feed of the lubricant in a finely atomized or vaporous form to assure uniform entrainment thereof with the stream of pressure medium.

What I claim and desire to secure by Letters Patent is:

1. The method of supplying a liquid to a fluid pressure medium under flow including effecting initial movement of the liquid in excess of need from a source of supply by pressure of said fluid pressure medium, effecting subsequent movement of a portion of the liquid by capillary action to a place of aspiration, returning the remaining portion of the liquid to the source of supply, and aspirating the liquid moved by capillary action into the fluid pressure medium.

2. The method of supplying a liquid to a fluid pressure medium under flow including effecting movement of the lubricant from a source of supply by pressure of said fluid pressure medium, absorbing a portion of the moving liquid, aspirating the absorbed liquid into the fluid pressure medium, and controlling the aspirating effect on said absorbed liquid by drawing pressure medium from the source of supply to the point of aspiration independently of said absorption for relieving the aspirating effect on the absorbed liquid to regulate the amount of liquid supplied to the fluid pressure medium.

3. The method of supplying a liquid to a fluid pressure medium under flow including effecting movement of an excess amount of the lubricant from a source of supply by pressure of said fluid pressure medium, absorbing a portion of the liquid, returning the remaining portion of the liquid to the source of supply, aspirating the absorbed liquid into the fluid pressure medium, and controlling the aspirating effect on said absorbed liquid by drawing pressure medium from the source of supply to the point of aspiration for relieving the aspirating effect on the absorbed liquid to regulate the amount of liquid supplied to the fluid pressure medium.

4. A lubricator having a passage connecting an inlet with an outlet for a fluid pressure medium, aspirating means for effecting discharge of a lubricant into the fluid pressure medium in said passage, an absorbent material having connection with the aspirating means and with the inlet to said passage for conducting said lubricant to the aspirating means by capillary action, means for conducting lubricant to the absorbent material in excess of the rate of feed by said capillary action, and pulsating means in said conducting means actuated by pulsations of the fluid pressure medium into said conducting means for intermittent inlet of fluid pressure medium.

5. A lubricator having a passage for a fluid pressure medium, aspirating means for conducting lubricant into the passage responsive to aspirating effect of fluid pressure medium moving through said passage, a receptacle for containing a supply of said lubricant, capillary feeding means connected with the aspirating means for supplying said lubricant to the aspirating means, duct means having an inlet in connection with said receptacle for admitting lubricant into said duct means and having an inlet from said passage for admitting pressure medium to move the lubricant through said duct means, said duct means having a discharge to the capillary feeding means for supplying said lubricant thereto, and a check valve controlling flow of lubricant through said inlet and adapted to be actuated by pulsations in said fluid pressure medium.

6. A lubricator having a passage for a fluid pressure medium, aspirating means for conducting lubricant into the passage responsive to aspirating effect of fluid pressure medium moving through said passage, capillary feeding means connected with the aspirating means, a receptacle for containing a supply of said lubricant, duct means having an inlet in connection with said receptacle for admitting lubricant into said duct means and having an inlet from said passage for admitting fluid pressure medium to move the lubricant through said duct means, said duct means having a discharge to the capillary feeding means for supplying said lubricant thereto, and check valves controlling said inlets.

7. A lubricator having a passage for a fluid pressure medium and having a passageway for conducting lubricant into the passage responsive to aspirating effect of fluid pressure medium moving through said passage and across said passageway, a receptacle for containing a supply of said lubricant, an absorbent material at the inlet to said passageway for conducting said lubricant to the passageway by capillary action, and duct means having an inlet in connection with said receptacle for admitting lubricant into said duct means and having an inlet from said passage for admitting pressure medium to move the lubricant through said duct means, said duct means having discharge onto the absorbent material.

8. A lubricator having a passage for a fluid pressure medium and having a passageway for conducting lubricant into the fluid pressure passage responsive to aspirating effect of fluid pressure medium moving through said passage and across said passageway, a receptacle for containing a supply of said lubricant, an absorbent material in connection with said passageway for conducting said lubricant to the passageway by capillary action, duct means having an inlet in connection with said receptacle for admitting lubricant into said duct means and having an inlet from said passage for admitting fluid pressure medium to move the lubricant through said duct means, said duct having discharge onto the absorbent material, and check valves controlling said inlets.

9. A lubricator having a passage for a fluid pressure medium, aspirating means for conducting lubricant into the passage responsive to aspirating effect of fluid pressure medium moving through said passage, a receptacle for containing a supply of said lubricant, capillary feeding means having connection with the aspirating means, duct means connecting the receptacle with the capillary feeding means, means for passing fluid pressure medium into the duct means to move the lubricant through said duct means, and means for admitting pressure medium from the receptacle to said passage separately from said duct means for controlling the aspirating effect on said capillary feeding means.

10. A lubricator having a passage for a fluid pressure medium and having a passageway for conducting lubricant into the passage responsive to aspirating effect of fluid pressure medium moving through said passageway and across said passageway, a receptacle for containing a supply of said lubricant, an absorbent material for conducting said lubricant to the passageway by capillary action, duct means having an inlet connection with said receptacle for admitting lubricant into said duct means and having an inlet from said passageway for admitting fluid pressure medium to move the lubricant through said duct means, said duct means having a discharge for directing the lubricant into contact with the absorbent material for absorption thereby, check valves controlling said inlets, and means for admitting pressure medium from the receptacle to said passageway for controlling the aspirating effect on lubricant absorbed by the absorbent material.

11. A lubricator having a Venturi-shaped passageway and a main passageway having connection with the Venturi-shaped passageway in by passing relation with said Venturi-shaped passageway for dividing flow of a fluid pressure medium, the combination in said lubricator of capillary feeding means for delivering lubricant to the Venturi-shaped passageway for supplying lubricant to a pressure medium flowing therethrough to mix with a pressure medium flowing through the main passageway, a receptacle for containing a supply of said lubricant, means for delivering lubricant from the receptacle to the capillary feeding means responsive to the pressure medium flow through the main passageway, venting means in connection with the receptacle and said Venturi-shaped passageway to control aspiration effect of the pressure medium flowing through said Venturi-shaped passageway on the lubricant feed by said capillary feeding means.

12. A lulbricator having a Venturi-shaped passageway and a main passageway bypassing the Venturi-shaped passageway for dividing flow of a fluid pressure medium, a duct means having flow connection with the restricted portion of said Venturi-shaped passageway and having an inlet through which lubricant is aspirated into the flow through said Venturi-shaped passageway, a receptacle for containing a supply of lubricant, an absorbent material covering the inlet to said duct means for conducting lubricant by capillary action of said material, a duct having an inlet in connection with said receptacle for admitting lubricant into said duct, an inlet member in connection with the duct and oscillatable in said main passageway to present an inlet opening thereof to the flow of pressure medium, said duct having a terminal positioned to discharge on the absorbent material for supplying lubricant to the absorbent material, and check valves in said duct for controlling flow through the inlets of the duct.

13. A lubricator having a Venturi-shaped passageway and a main passageway bypassing the Venturi-shaped passageway for dividing flow of a fluid pressure medium, a duct means having flow connection with the restricted portion of said Venturi-shaped passageway through which lubricant is aspirated into the flow through said Venturi-shaped passageway, a receptacle for containing a supply of lubricant, an absorbent material covering said duct means for conducting lubricant by capillary action of said material, a duct having an inlet in connection with said receptacle for admitting lubricant into said duct, and an inlet member in connection with the duct and oscillatable in said main passageway to present an inlet opening thereof to the flow of pressure medium, said duct having a terminal positioned to discharge on the absorbent material for supplying lubricant to the absorbent material.

14. A lubricator having a flow head provided with a Venturi-shaped passageway and a main passageway bypassing the Venturi-shaped passageway for dividing flow of a fluid pressure medium through said head and having a port in the restricted portion of said Venturi-shaped passageway through which lubricant is aspirated into the flow through said Venturi-shaped passageway, an absorbent carrying member carried by the flow head and having a channel in connection with said port, a receptacle for containing a supply of lubricant, means for securing the flow head to the receptacle, an absorbent material covering the channel in said absorbent carrying member for conducting lubricant by capillary action of said material, a U-shaped duct means depending into the receptacle and having an inlet for admitting lubricant and having a leg portion connected with the main passageway for admitting fluid pressure medium for moving lubricant through said duct means and having a leg portion having discharge on the absorbent material for supplying lubricant to the absorbent material, and check valves controlling flow of lubricant and pressure medium into said duct means.

PETER KETELSEN.

REFERENCES CITED

The following references are of record in the file of this patent:

UNITED STATES PATENTS

| Number | Name | Date |
| --- | --- | --- |
| 1,621,771 | Egan | Mar. 22, 1927 |
| 2,229,176 | Kehle | Jan. 21, 1941 |

FOREIGN PATENTS

| Number | Country | Date |
| --- | --- | --- |
| 546,368 | Great Britain | 1942 |